(12) United States Patent
Knox et al.

(10) Patent No.: US 11,867,602 B2
(45) Date of Patent: Jan. 9, 2024

(54) DEVICE, SYSTEM AND METHOD FOR THE DETECTION AND SCREENING OF PLASTIC MICROPARTICLES

(71) Applicant: University of Rochester, Rochester, NY (US)

(72) Inventors: Wayne H. Knox, Rochester, NY (US); Gregory Madejski, Albion, NY (US); James Lionel McGrath, Rochester, NY (US)

(73) Assignee: University of Rochester, Rochester, NY (US)

( * ) Notice: Subject to any disclaimer, the term of this patent is extended or adjusted under 35 U.S.C. 154(b) by 80 days.

(21) Appl. No.: 17/579,515

(22) Filed: Jan. 19, 2022

(65) Prior Publication Data

US 2022/0228964 A1     Jul. 21, 2022

Related U.S. Application Data

(60) Provisional application No. 63/140,225, filed on Jan. 21, 2021.

(51) Int. Cl.
| | | |
|---|---|---|
| *G01N 15/06* | (2006.01) | |
| *B01D 71/02* | (2006.01) | |
| *B01D 61/20* | (2006.01) | |

(52) U.S. Cl.
CPC ......... *G01N 15/0612* (2013.01); *B01D 61/20* (2013.01); *B01D 71/02* (2013.01); *B01D 2311/103* (2013.01); *G01N 2015/0681* (2013.01); *G01N 2015/0693* (2013.01)

(58) Field of Classification Search
None
See application file for complete search history.

(56) References Cited

U.S. PATENT DOCUMENTS

2021/0215584 A1 *   7/2021   Carter ............... B01D 71/02

OTHER PUBLICATIONS

Schwaferts et al, "Methods for the analysis of submicrometer- and nanoplastic particles in the environment" Trends in Analytical Chemistry 112 (2019) 52-65 (Year: 2019).*

Schymanski et al, "Analysis of microplastics in water by micro-Raman spectroscopy: Release of plastic particles from different packaging into mineral water" Water Research 129 (2018) 154-162 (Year: 2018).*

* cited by examiner

*Primary Examiner* — Krishnan S Menon
(74) *Attorney, Agent, or Firm* — Patent Technologies, LLC; Robert D. Gunderman, Jr.

(57) ABSTRACT

A device, system and method for the detection and screening of plastic microparticles in a sample is disclosed. A nanoporous silicon nitride membrane is used to entrap plastic microparticles contained in the sample. The sample may be a water sample, an air sample, or other liquid or gas sample. The entrapped plastic microparticles are then heated or otherwise processed on the nanoporous silicon nitride membrane. An imaging system observes the nanoporous silicon nitride membrane with the entrapped plastic microparticles to determine the type and quantity of the various plastic microparticles that are entrapped on the membrane.

4 Claims, 18 Drawing Sheets
(13 of 18 Drawing Sheet(s) Filed in Color)

401    403

405    407

601

1101

D/C - Brightfield

1401

DEVICE, SYSTEM AND METHOD FOR THE DETECTION AND SCREENING OF PLASTIC MICROPARTICLES

CROSS REFERENCE TO RELATED PATENT APPLICATIONS

This application claims priority to U.S. patent application Ser. No. 63/140,225 filed Jan. 21, 2021 entitled "System and Method For The Detection and Screening of Plastic Microparticles", the entire disclosure of which is incorporated herein by reference in its entirety.

STATEMENT REGARDING FEDERALLY SPONSORED RESEARCH OR DEVELOPMENT

This invention was made with government support under NIH ES001247 awarded by National Institutes of Health. The government has certain rights in the invention.

BACKGROUND OF THE INVENTION

1. Field of the Invention

The present invention relates generally to materials testing, and more particularly to a device, system and method for the detection and screening of plastic microparticles in a sample such as a water supply sample.

2. Description of Related Art

Plastic production has increased significantly since major introductions of a variety of plastics and plastic manufacturing techniques that started in the 1960s. As a result of this proliferation, many kinds of plastics have found their way into our environment. Many of these plastics do not degrade, or degrade slowly on time scales of a thousand years or so. As plastics in the environment are subjected to a variety of weather conditions, they actually degrade into smaller particles, eventually covering size ranges all the way down to micron, submicron, or even nanoparticle sizes. The presence of micro- and nano-plastic particles in our environment, such as our drinking water supplies, is one result of this weathering and degradation, and is of concern. At present, it is possible to easily obtain a home water testing kit through a variety of sources. These kits provide a testing report on the presence of heavy metals, volatile organic compounds, etc., but not plastic microparticles. There is currently no home testing kit for plastic microparticles contained in an environmental sample such as a water sample.

Presently, the sorting and identification of plastic microparticles in a water sample is a very manual process typically involving microscopy with human observation, which is a slow and laborious process that is not scalable. The "hot-needle" method has been historically used as a way to simply determine if a suspected sample is plastic or not. This method encompasses contacting a particle with a heated needle to observe if the particle chars or 'melts'. However easy, this technique is time consuming, as it requires serial evaluation of individual particles. Also, the method becomes increasingly difficult as the particulate becomes smaller (1-100 micron scale). Clearly, if low cost home testing for plastic microparticles in a water sample is to be contemplated, a rapid and automated screening system is needed.

BRIEF SUMMARY OF THE INVENTION

In accordance with the present invention, there is provided a device, system and method for the detection and screening of plastic microparticles in a sample such as a water sample.

A novel nanoporous silicon nitride membrane is used to entrap plastic microparticles in a sample. The trapped plastic microparticles are then heated on the nanoporous silicon nitride membrane. The nanoporous silicon nitride membrane is observed as it heats up. Various microscopy, optical or machine vision systems may be employed for this observation. The temperatures at which the various trapped plastic microparticles melt are recorded, with the melting point of each plastic microparticle being an indication of the type of plastic from which it is made. In some embodiments, optical techniques such as excitation, scanning and observation are employed either with or without the application of heat. Type and quantity of the various plastic microparticles are then determined and provided in a test report.

The foregoing has been provided by way of introduction, and is not intended to limit the scope of the invention as described by this specification, claims and the attached drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will be described by reference to the following drawings, in which like numerals refer to like elements, and in which.

Figure 1:
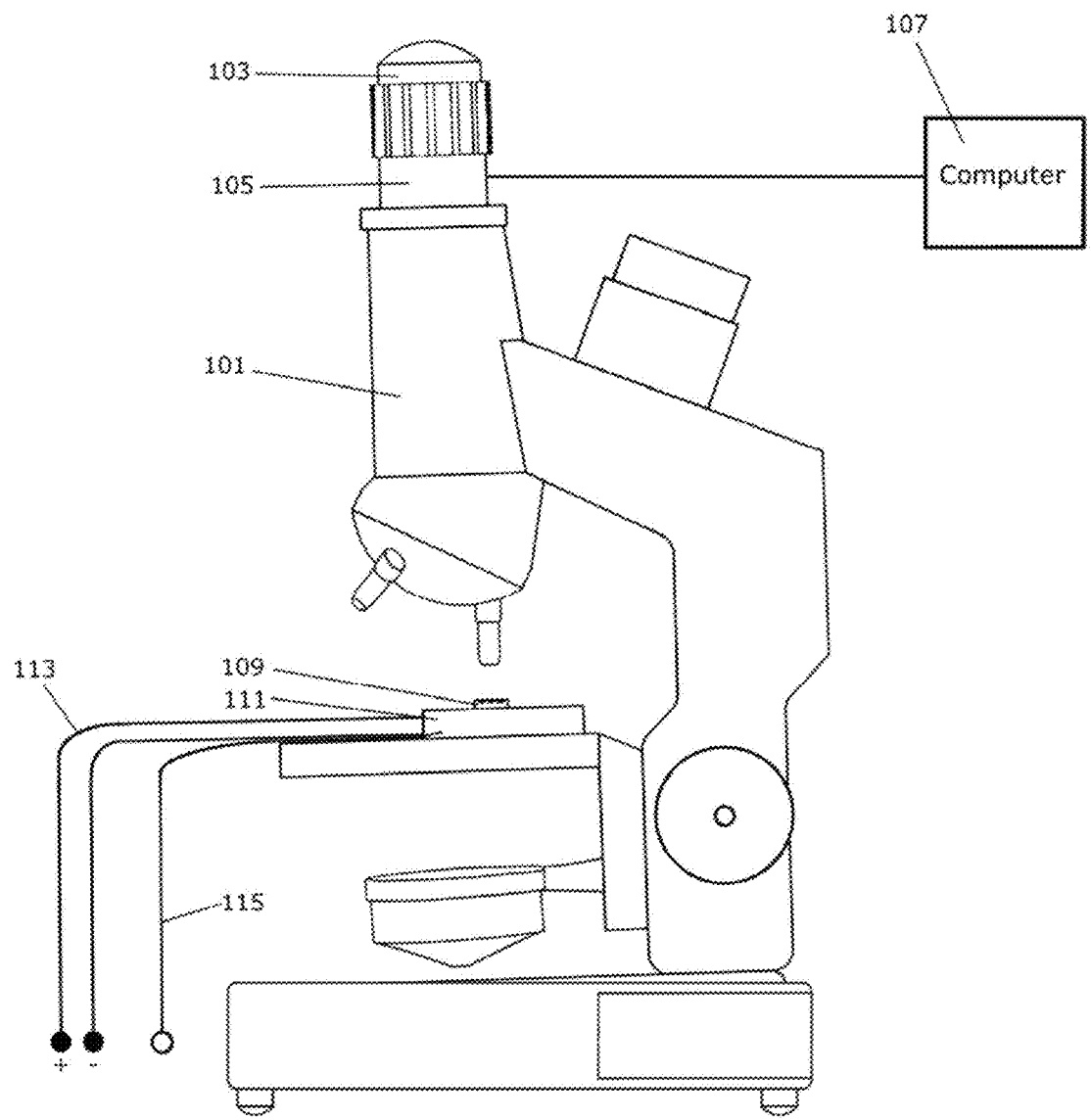
FIG. 1 depicts a device for the detection and screening of plastic microparticles in accordance with one embodiment of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification, claims and drawings attached hereto.

DESCRIPTION OF THE PREFERRED EMBODIMENTS

The present invention involves the capture and analysis of plastic microparticles in a sample, such as a water or air sample. In some embodiments, other liquid or gas samples may also be analyzed. A device, system and method for the detection and screening of plastic microparticles in a sample is thus described, with various embodiments also described and envisioned herein.

The present invention makes use of nanoporous silicon nitride membranes to capture and then heat and analyze microparticulates in a sample. Throughout this specification, the sample may be described by way of example, and not limitation, as a water sample. In some embodiments of the present invention, optical techniques are employed either with or without the application of heat to determine plastic content and type of plastic microparticulates contained in the sample.

In order to evaluate many particulates in a sample at once, the system simultaneously heats and observes particles caught on a silicon nitride nanomembrane substrate. The substrate is inert over the common temperature ranges used to liquefy plastic polymers. Heating of the silicon nitride nanomembrane may involve a heat source such as a ceramic plate resistor plugged into a power source and suspended under a microscope (imaged with 10-40× air objectives). The nanomembrane substrate can be moved directly from filtering a sample such as a water sample onto the heat source and heated sequentially by altering, in the case of a ceramic plate resistor, the current flowing through the resistor via a power supply or battery. Through heating the nanomembrane all at once while being viewed under the microscope, one can image and record video of the process, correlate that information with the temperature change at each point in time, and determine at what temperature each plastic is liquefying. Real-time video imaging can then be sped up to better visualize the melting process. This novel device, system and method allows one to perform an equivalent 'hot needle test' with an entire sample of microparticulates at one time, in a more efficient manner. The ability to perform heating operations directly on the nanomembrane substrate allows for less transfer of material and contamination. This is a very useful tool for people studying plastic microparticles as it allows a quick and rapid assessment of the plastic content in their sample. It has the capabilities to determine if plastics are present and what composition those plastics have without the use of expensive technology such as FT-IR or Raman microspectroscopy. The present invention may also include, in some embodiments, precise weighing of the sample as it is heated (thermogravimetric analysis), which would also provide additional mass and composition information. Overall this technique will allow for efficient characterization of plastics within environmental samples without the need for time consuming spectroscopy.

The system for the detection and screening of plastic microparticles in a sample such as a water sample in one embodiment comprises a nanoporous silicon nitride membrane to capture the plastic microparticles, a heat source for raising the temperature of the nanoporous silicon nitride membrane until the plastic microparticles begin to melt, a temperature sensor for monitoring the temperature rise of the membrane and captured microparticles, and an observation device such as a microscope or machine vision system to determine the temperature at which each plastic microparticle melts, thus indicating the type of material the microparticle is made from.

The nanoporous silicon nitride membrane is described, for example, in United States Patent application publication 2016/0199787 A1 to Striemer el al. and entitled Nanoporous Silicon Nitride Membranes, And Methods For Making And Using Such Membranes, the entire disclosure of which is incorporated herein by reference. Other membranes, devices and methods applicable to the present invention and the various embodiments described, depicted and envisioned herein are disclosed in U.S. Pat. Nos. 8,518,276 and 8,501,668, the entire disclosures of which are incorporated herein by reference in their entirety.

Figure 2:
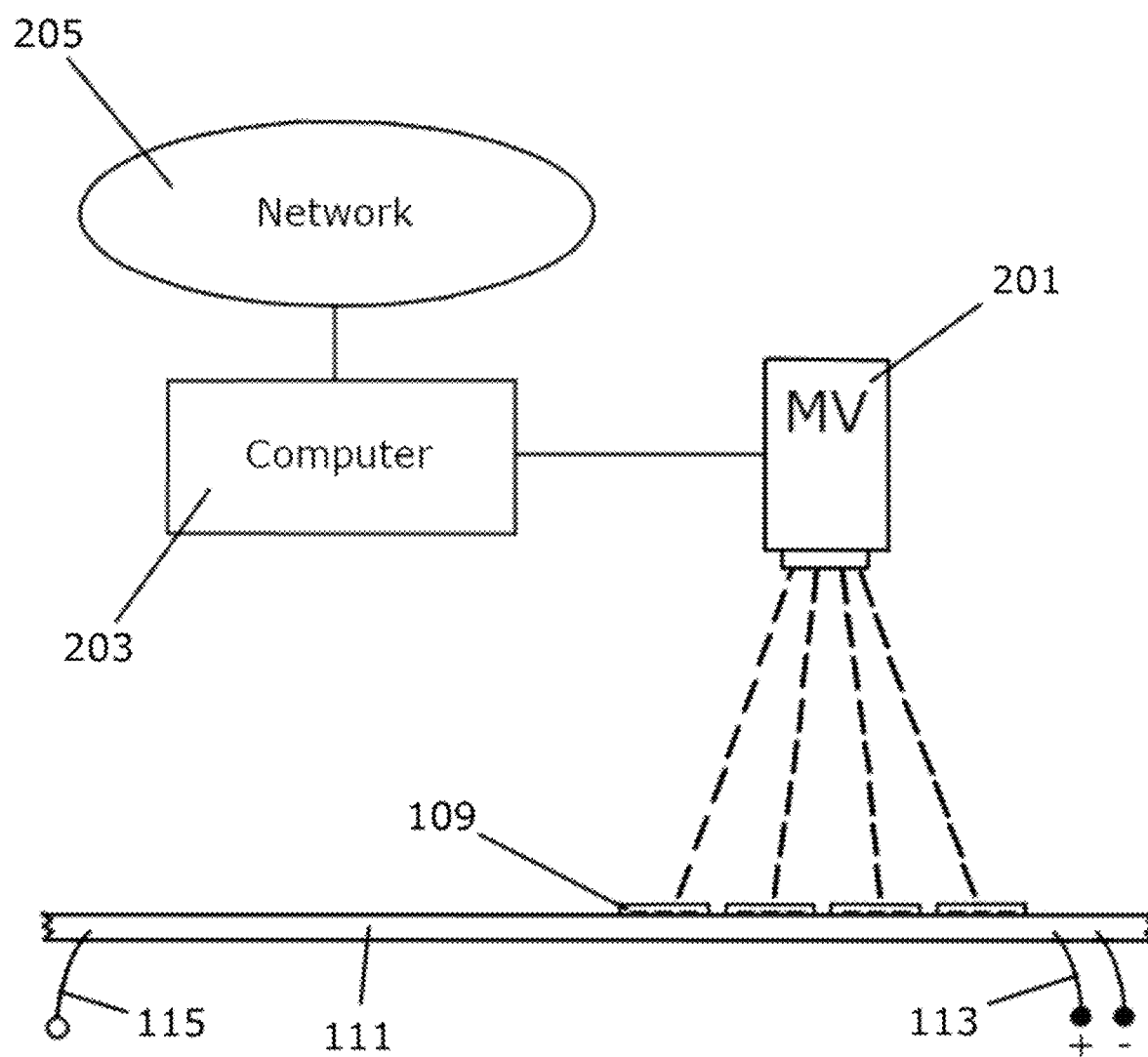
FIG. 2 depicts a device for the detection and screening of plastic microparticles in accordance with a further embodiment of the present invention.

Turning now to the drawings, several embodiments of the device for the detection and screening of plastic microparticles are depicted in FIGS. 1 and 2.

In one example, a water sample is passed through a nanoporous silicon nitride membrane 109 using a suitable fixture to hold the membrane. An example of a suitable fixture is a silicone fixture that sandwiches or otherwise retains a nanoporous silicon nitride membrane while allowing a water sample to pass there through without leakage of unwanted flow. Once the water sample is passed through the membrane such that microparticles contained in the water sample are captured, the membrane is then placed within an imaging device or system such as the microscope 101 depicted in FIG. 4 or the machine vision system 201 depicted in FIG. 2. Analysis techniques for microparticulates captured by the present invention include Scanning Electron Microscopy (SEM), Brightfield/DIC, Fluorescence, Raman Spectroscopy, Surface Profiling, Birefringence, heating glass transition, as well energy-dispersive X-ray spectroscopy.

To gain further information related to the captured microparticles, there are many ways to combine different data sets and link up enumerated objects to gain more information using techniques such as Principal component Analysis or Multi-level voting models. For example, use of techniques such as Brightfield, Staining, and Birefringence in combination result in improved identification of material types.

A significant benefit of the present invention is the use of a nanoporous silicon nitride membrane for both sampling and analysis, eliminating the need to transfer the captured microparticles from a filtration media to an analysis platform. The microscope 101 can be seen in FIG. 1 with an eyepiece for manual observation of melting points and related optics 105. A computer 107 may be employed to record or otherwise detect the melting points of the various microparticles and the quantity of each type of microparticle contained on the sample nanoporous silicon nitride membrane. A heat source or heating element 111 then raises the temperature of the membrane such that the microparticles begin to melt if they are plastic. The heating element may be, for example, a ceramic plate resistor where the temperature can be increased through a proportional increase in current through the ceramic plate resistor. Wires 113 car be seen from the heating element 111 and are connected to a source of electric power (not shown in FIG. 1). A temperature sensor 115 such as a thermocouple, thermistor, bimetallic device, liquid expansion device, silicon diode, resistive temperature device, infrared sensor, or the like is thermally connected to the nanoporous silicon nitride membrane. In some embodiments, a network connection 205 (see FIG. 2) is made to transfer testing data to other downstream systems. While FIG. 2 depicts a machine vision system 201, other imaging systems such as, but not limited to, thermal imaging and thermal mapping systems, may be used. FIG. 2 depicts such a system where a plurality of sample nanoporous silicon nitride membranes are tested simultaneously in an automated or semi-automated fashion. An imaging system such as, but not limited to, a machine vision system 201 can be seen sampling multiple test membranes 109 that are under test with an active heating element 111. The machine vision system 201 is connected to a computer 203 and in many embodiments a network 205. The computer 203 may contain software that executes methods in accordance with the present invention. Such methods include, but are not limited to, controlling the temperature profile and ramp up of the heating element 111, locating and mapping microparticles trapped on a nanoporous silicon nitride membrane under test, determining if a mapped microparticle is melting, determining at what temperature the mapped microparticle is melting, and determining the type of plastic that the mapped microparticle is made from based on the determined melting point of the mapped microparticle.

The machine vision system 201 may include machine learning, where the machine learning component may be a form of computer vision where pixels are captured, stored and classified. Machine learning may also include segmentation, noise removal and image modification, object enumeration, and the like.

For pixel classification, software to determine which pixels belong to a certain class is used. The speed and accuracy of the software is impacted by the choice of algorithm used as well as the feature training set. During pixel classification, a probability map is generated. Segmentation then occurs using object detection, semantic segmentation, or instance segmentation. Thresholding the pixel probability classification then provides semantic segmentation. Further image processing turns the semantic segmentation into individual instances, which are then enumerated. As image processing occurs, different algorithms can be run to improve the localization of instance segmentation to reality. Binary erode and dilate operations shrink and expand along the perimeters of objects. Despeckling loops remove pixel-noise from the image. In addition, watershedding separates individual objects and is used to perform instance segmentation in a group. The machine vision system 201 may also continue with further image processing to provide a more complete picture of the types of microparticulates contained in the water sample. For example, the generated probability map can be subject to different image processing algorithms to accentuate certain features, such as discriminating between particles and fibers in a sample.

In some embodiments, the machine vision system 201 recombines information from different image processing routes to provide a more complete picture of everything in the image. For example, an edge-loop algorithm may be used to find particles that span the entire image or loop on itself, with those pixels then being removed from the subsequent analysis.

During machine learning, various characteristics of the detected microparticles such as size, diameter, aspect ratio, and location are listed to aid with microparticle identification. Additional higher level statistics can be calculated from the population of enumerated instances that include density, averages, variance, and the like.

Figure 3:
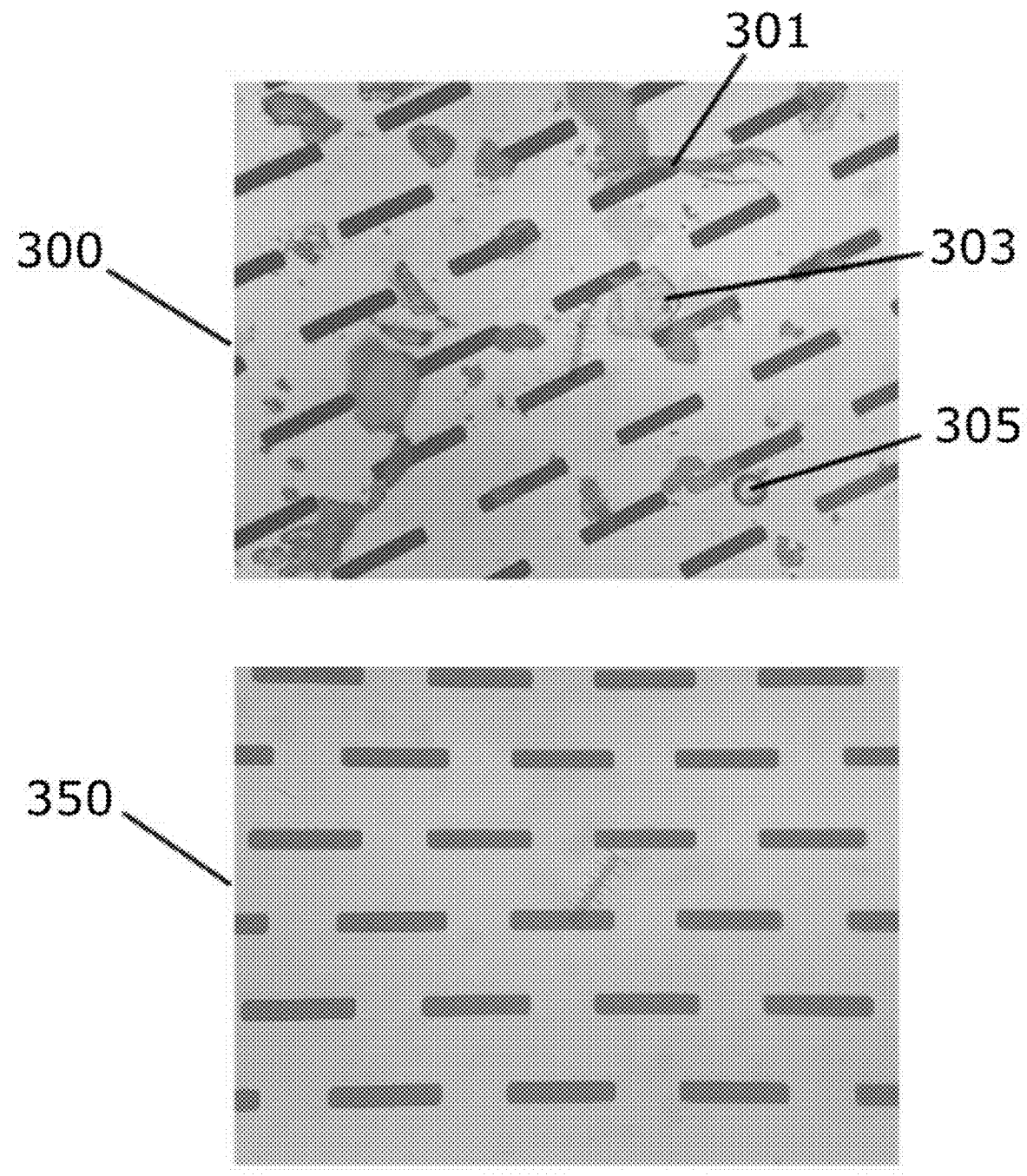
FIG. 3 depicts a silicon nitride membrane with microslits capturing microparticles.

Turning now to FIG. 3, a silicon nitride membrane with microslits capturing microparticles can be seen. In the upper image, a silicon nitride membrane filter with microslits can be seen with various microparticles being retained from tap water. A captured fiber 301 can be seen, as well as a captured fragment 303 and a captured bead 305. These microparticles were captured from a drinking water sample. The lower image depicts an example of a nanoporous silicon nitride membrane with 8 micron wide microslits imaged using a simple compound microscope in 100% ethanol.

Figure 4:
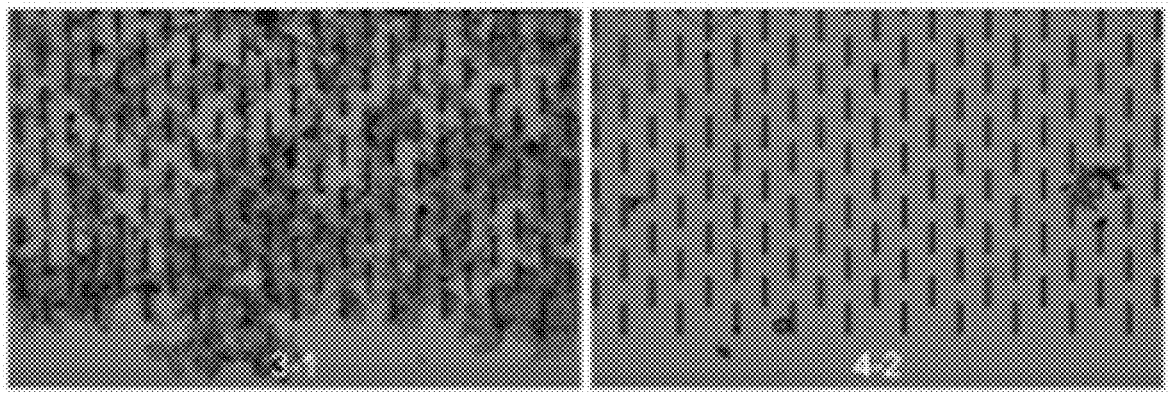
FIG. 4 depicts trapped microparticles from various water samples.
Figure 4:
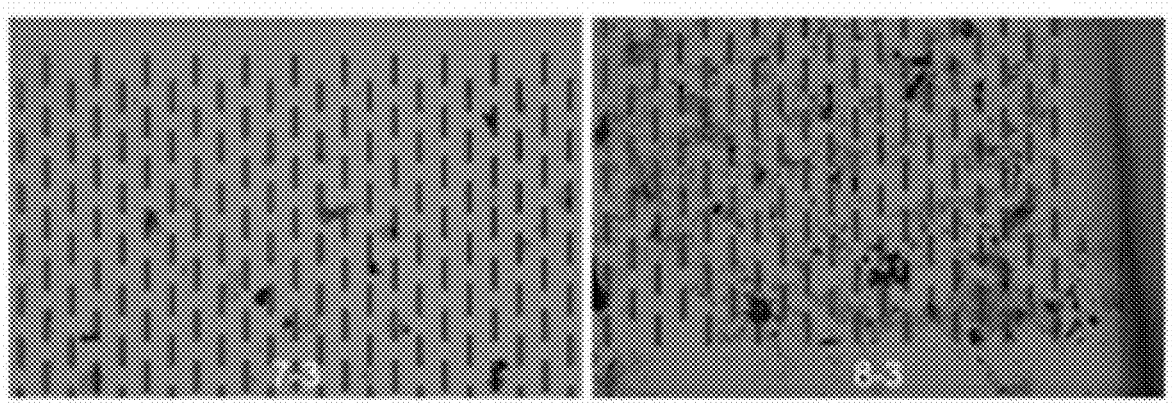
Figure 5:
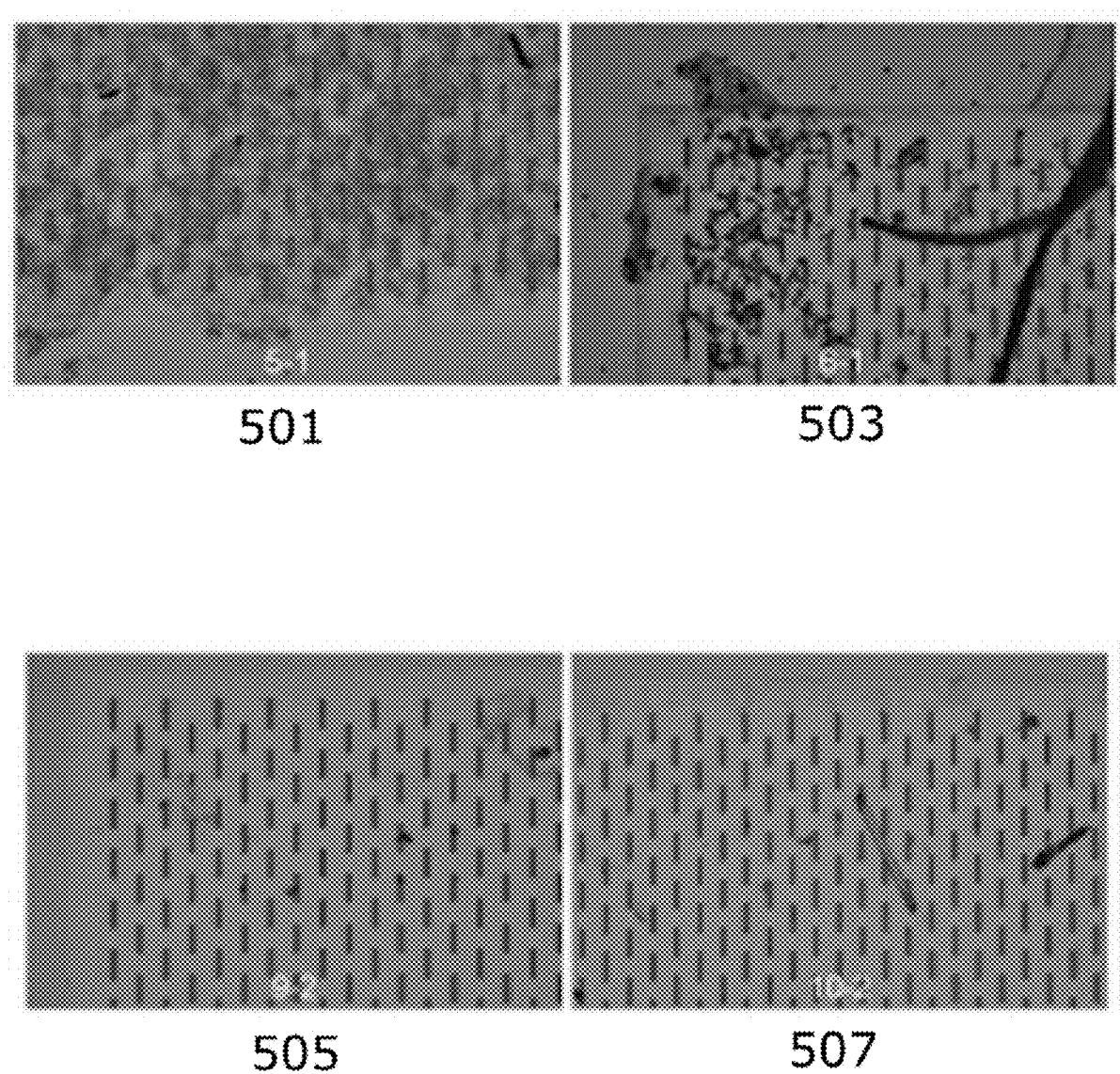
FIG. 5 depicts trapped microparticles from further water samples.

FIGS. 4 and 5 depict trapped microparticles from various water samples taken throughout the water supply system that supplies the University of Rochester campus in Rochester, New York, 401 depicts a sample taken at a filtration column. 403 depicts a sample taken at the output of the water plant, 405 depicts a sample taken at the entrance to the University of Rochester, 407 depicts a sample taken from Goergen Hall water pipes on campus, 501 depicts a sample taken from Rush Reservoir, a water reservoir that is part of the public water supply system providing tap water to the University of Rochester, 503 depicts a sample taken leaving the Rush Reservoir, 505 depicts a sample taken from a drinking fountain on campus at 0 minutes, and 507 depicts a sample taken from a drinking fountain on campus at 5 minutes.

Figure 6:
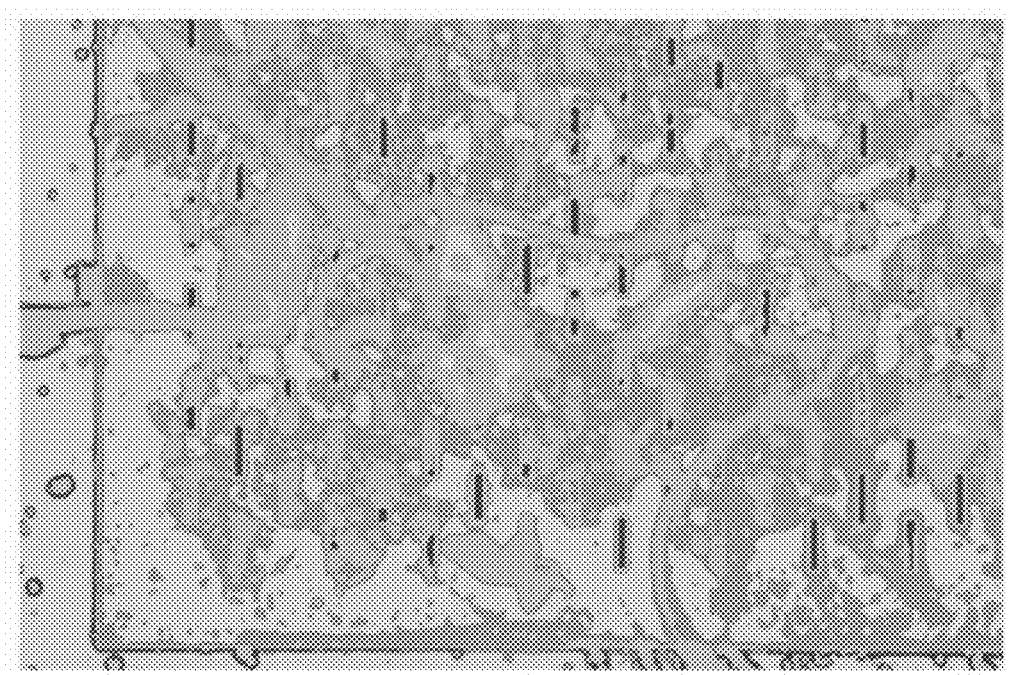
FIG. 6 illustrates semi-automatic detection and segmentation of microparticulates in a water sample.

FIG. 6 illustrates semi-automatic detection and segmentation of microparticulates in a water sample. In this example, pixel classifiers are used with an imaging system to determine estimates for the type of material being viewed. Illumination conditions provide algorithmic estimates of the type of material in the view field, with the type of material being color coded. In this example, red indicates the membrane slots, green is debris, yellow is the membrane substrate itself, purple is residue, and orange is the edge.

Figure 7:
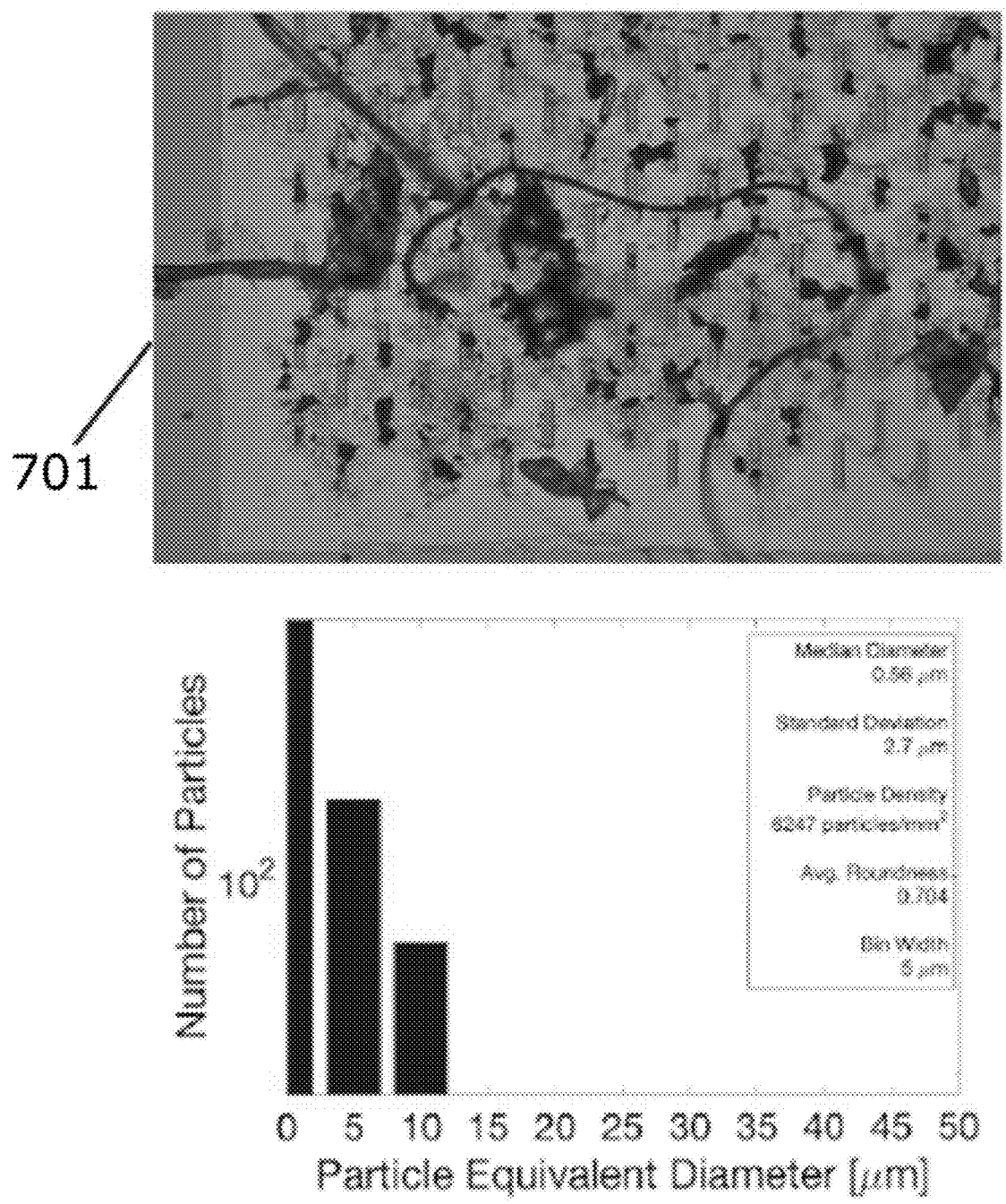
FIG. 7 further illustrates semi-automatic detection and segmentation of microparticulates in a water sample.

FIG. 7 further illustrates semi-automatic detection and segmentation of microparticulates in a water sample. The image 701 is processed using a method of the present invention where that method comprises imaging of the trapped microparticulates, mapping of the discrete microparticulates, and measuring an estimated particle equivalent diameter. In some embodiments, ranges of particle equivalent diameters are sorted or classified so that the number of particles in each size range is determined.

Figure 8:
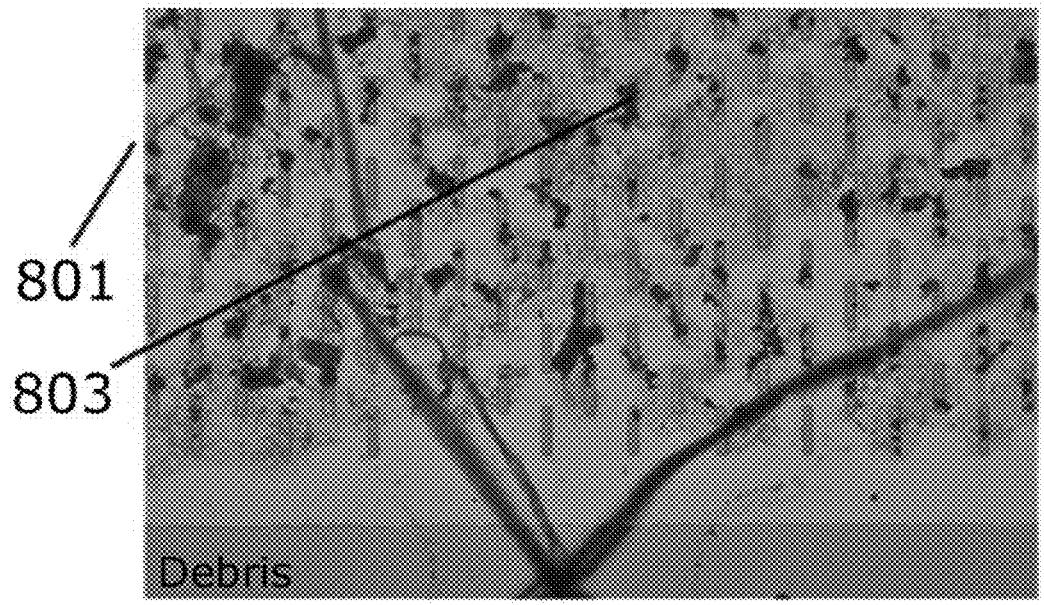
FIG. 8 illustrates shape based classification of microparticulates in a water sample.
Figure 8:
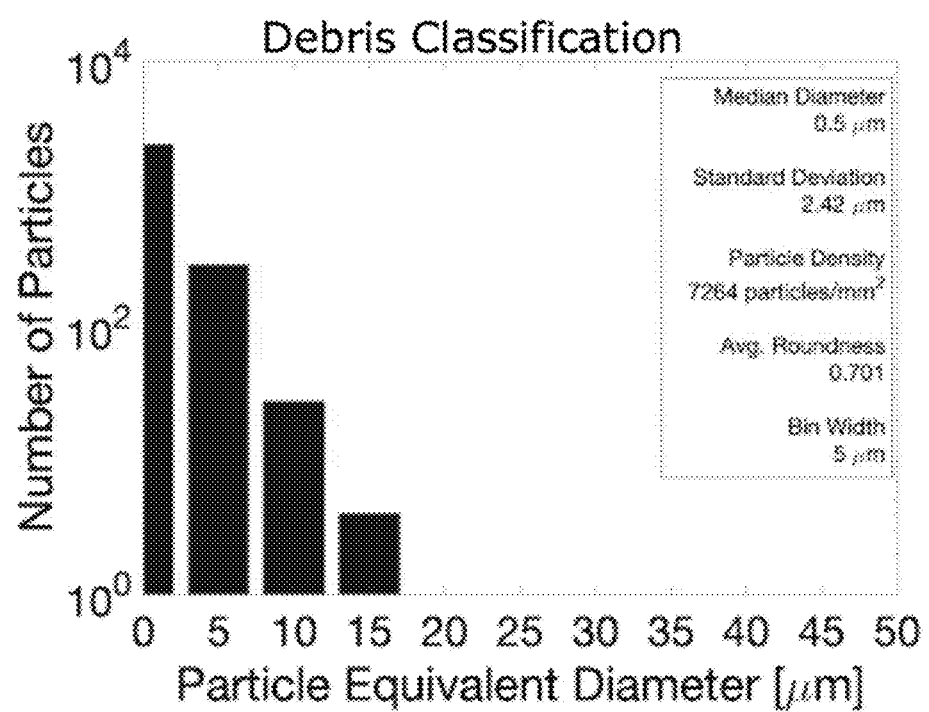

FIG. 8 further illustrates shape based classification of microparticulates in a water sample where the sample 801 is further classified under the category debris with debris 803 on the sample substrate being highlighted in blue and particle equivalent diameters defined and categorized in accordance with the method of the invention described herein.

Figure 9:
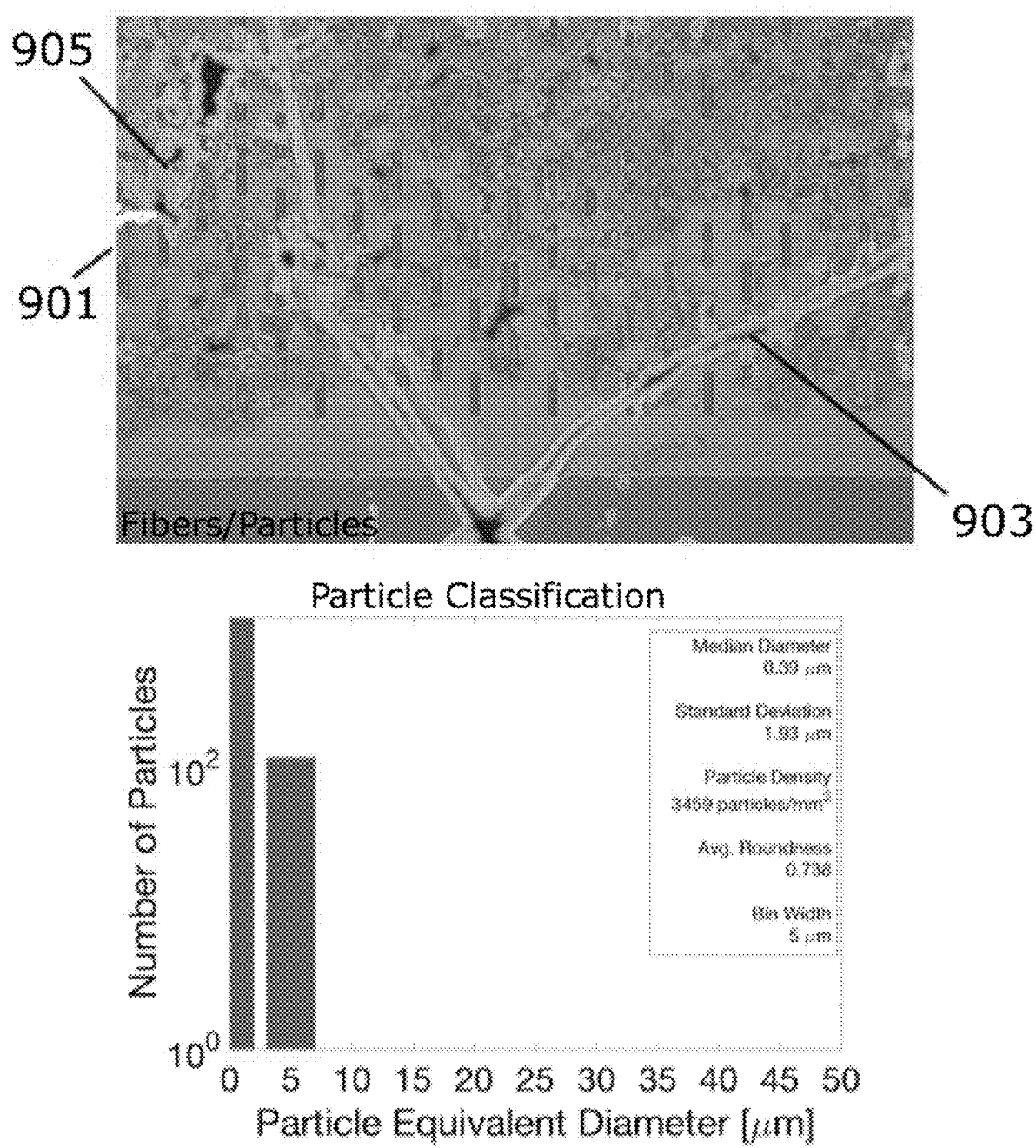
FIG. 9 illustrates further shape based classification of microparticulates in a water sample.

FIG. 9 illustrates further shape based classification of microparticulates in a water sample where the sample 901 is further categorized under the categories fiber 903 shown in green and particles 905 shown in red.

Figure 10:
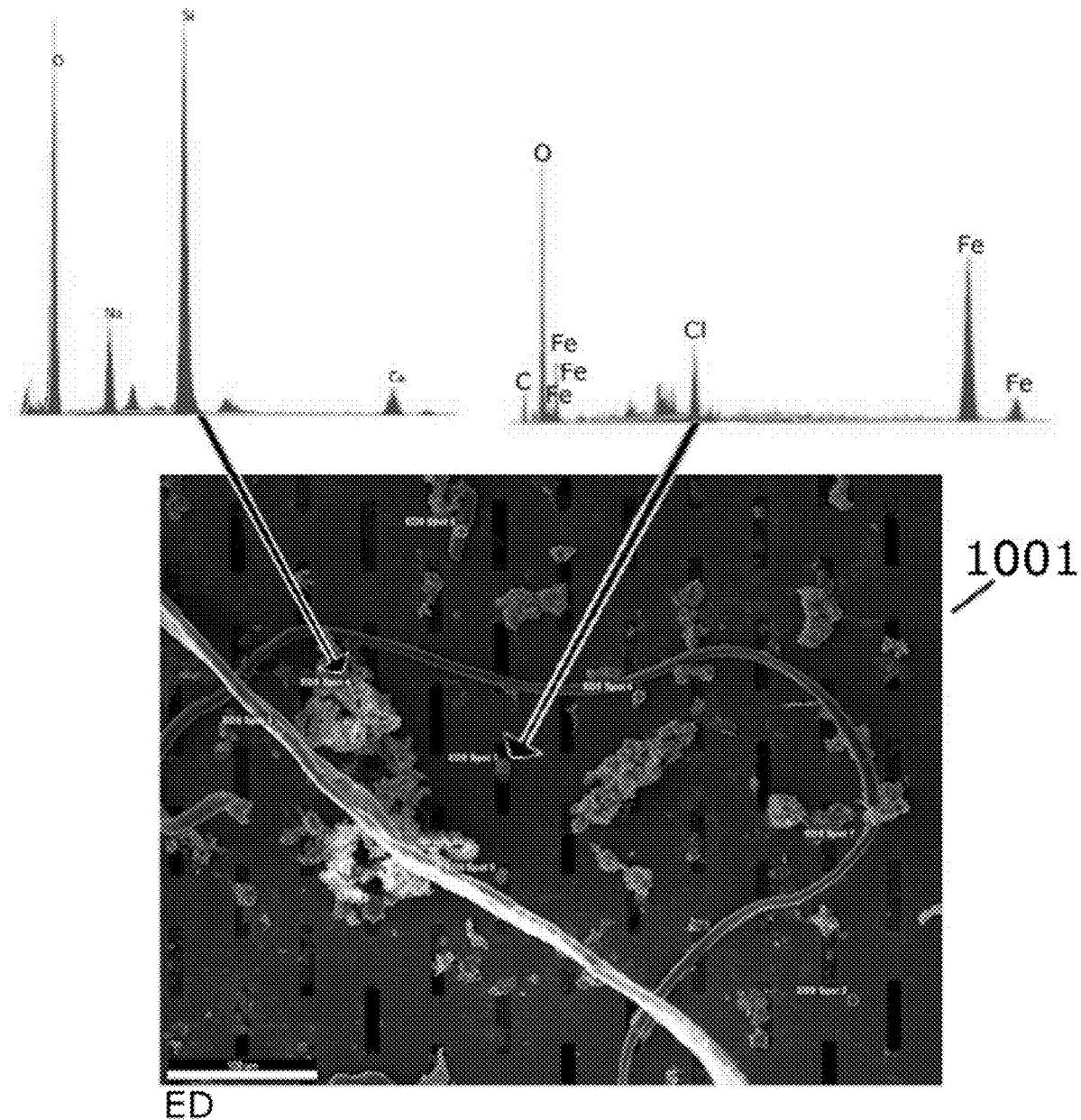
FIG. 10 illustrates the use of energy-dispersive x-ray spectroscopy for determining elemental composition of microparticulates.
Figure 11:
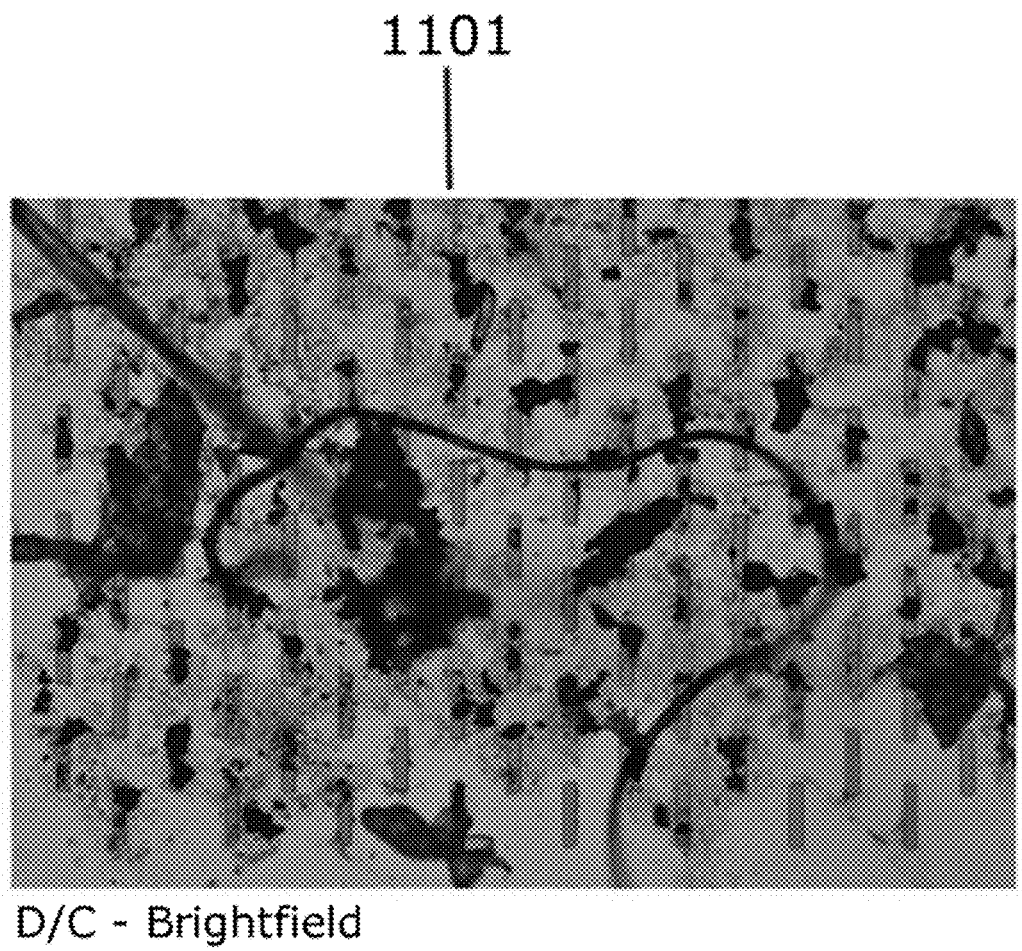
FIG. 11 further illustrates the use of energy-dispersive x-ray spectroscopy for determining elemental composition of microparticulates.

FIG. 10 illustrates the use of energy-dispersive x-ray spectroscopy for determining elemental composition of microparticulates. As seen, the sample 1001 yields graphical spikes where each spike defines the composition of the microparticle imaged with energy-dispersive x-ray spectroscopy. FIG. 11 shows the brightfield image of the sample depicted in FIG. 10.

Figure 12:
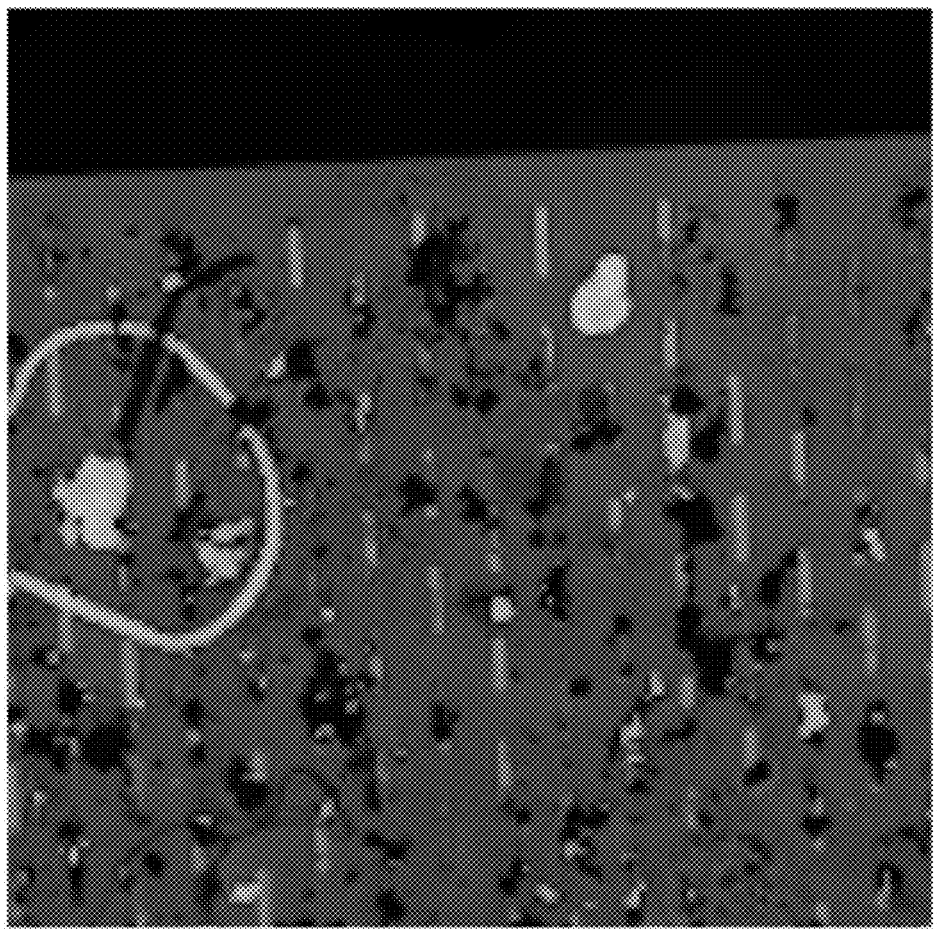
FIG. 12 illustrates the use of lipophobic fluorescent dye for determining elemental composition of microparticulates.

FIG. 12 illustrates the use of lipophobic fluorescent dye for determining elemental composition of microparticulates. In this example, Nile Red is used to provide fluorescent staining of target plastic microparticles.

Figure 13:
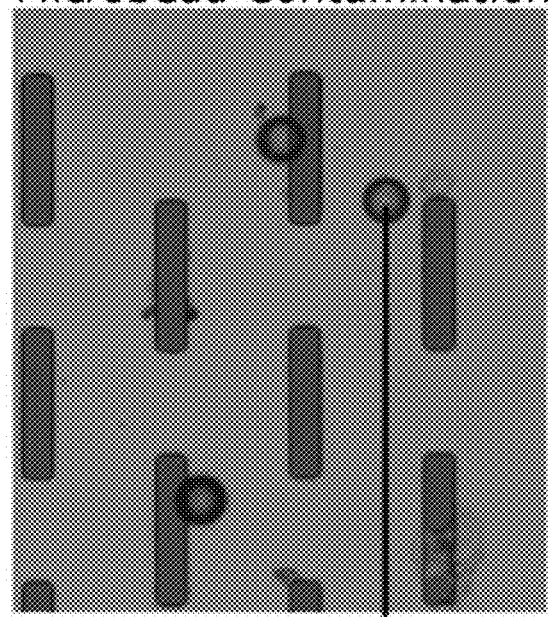
FIG. 13 illustrates the use of Raman spectroscopy to determine molecular bond structure of microparticulates.
Figure 13:
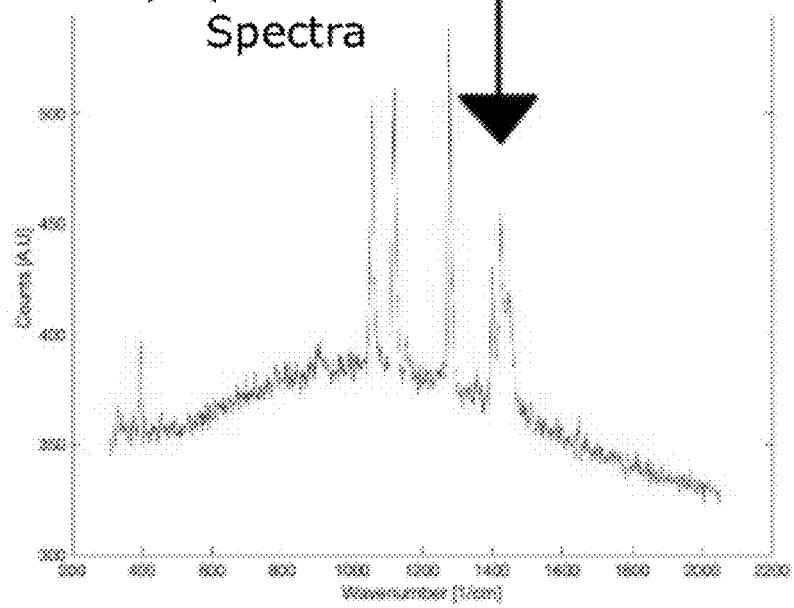

FIG. 13 illustrates the use of Raman spectroscopy to determine molecular bond structure of microparticulates. In this example, the Raman spectra for Polystyrene can be seen for the sample 1301 containing microbeads in question.

Figure 14:
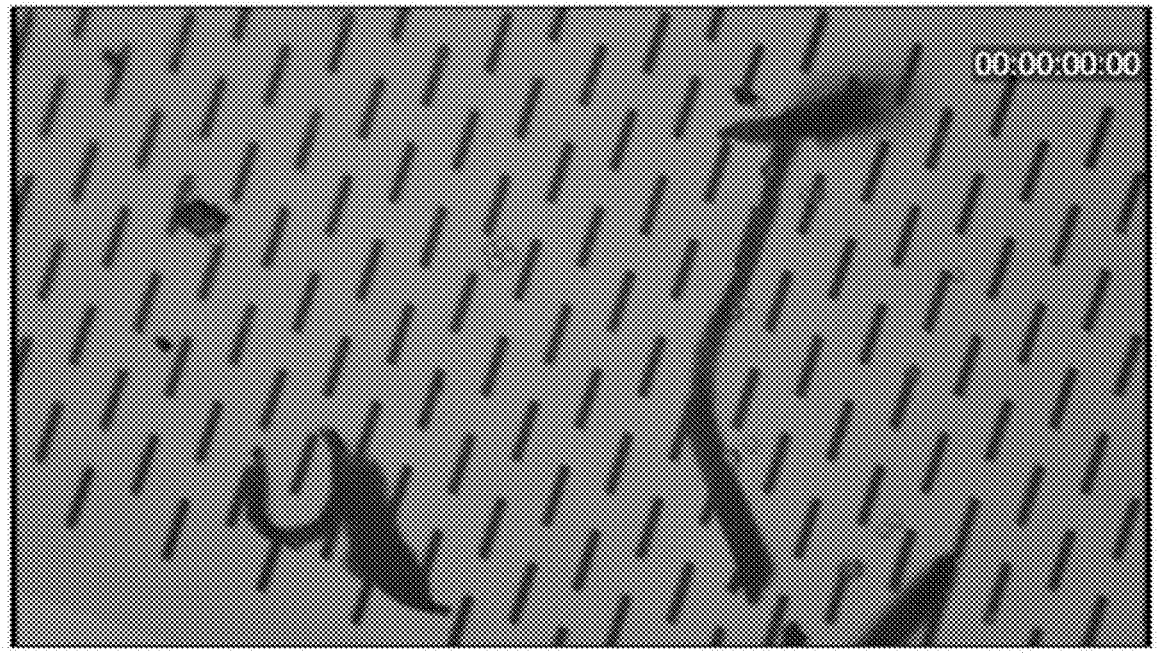
FIG. 14 illustrates the use of heat based glass transition observation to identify the composition of microparticulates.

FIG. 14 illustrates the use of heat based glass transition observation to identify the composition of microparticulates. In the sample 1401, various microparticles can be seen. Different plastic materials have different glass transition temperatures. In this example, polystyrene beads maintain stability under specified temperatures, while polyethylene shreds exhibit twist or related deformation under heating of 100 degrees Celsius or higher. This type of analysis is only possible with metal or ceramic membranes. In some embodiments of the present invention, pyrolysis of the material while being weighed would also provide mass and material classifications.

Figure 15:
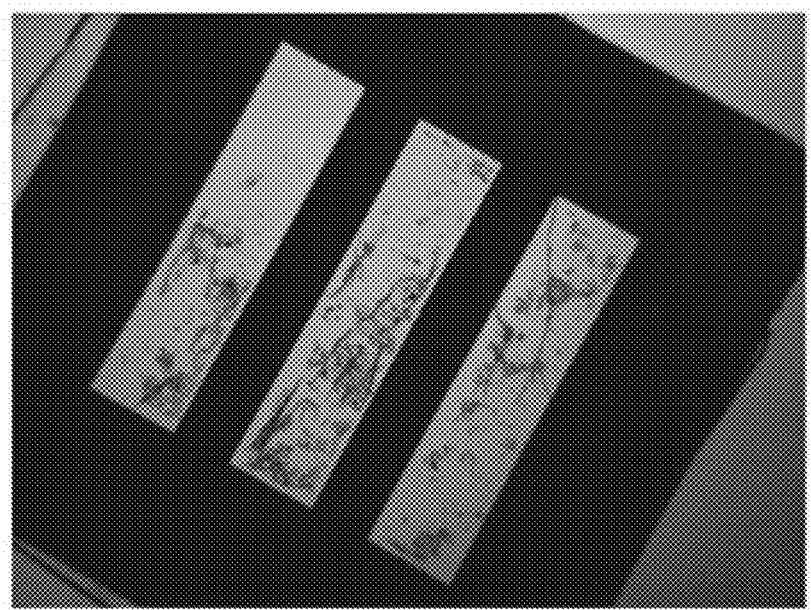
FIG. 15 illustrates the use of birefringence observation to identify the composition of microparticulates.
Figure 15:
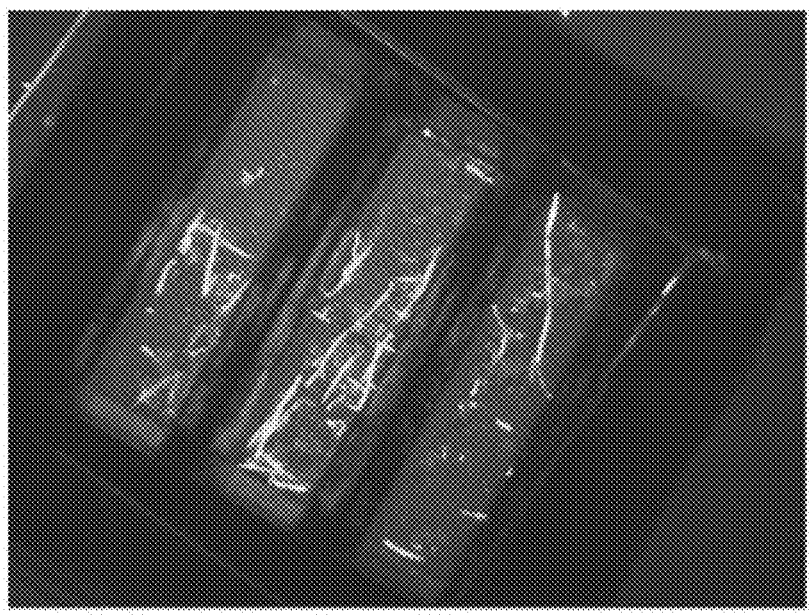

FIG. 15 illustrates the use of birefringence observation to identify the composition of microparticulates. Heating of plastics causes internal stresses to relax which in turn causes a shift in their strain profiles. Birefringence can be used to observe the temperature at which the strain relaxes, which is indicative of different material properties. Thermobirefringence or thermal birefringence, the change in birefringence with the application of heat, can be effectively used to characterize the composition of plastic microparticles in accordance with the present invention. The image at the top of FIG. 15 shows a sample under yellow light, where the image at the bottom of FIG. 15 depicts native birefringence showing tea bag fibers in yellow. Certain microfibers and microparticles exhibit birefringence when viewed through crossed polarizers in a microscope setup. For example, plastic microparticles derived from extruded or wound fibers are inherently birefringent (having refractive indices that depend on the polarization of illuminating light). Further, many plastic microparticles have phase transition temperatures (glass transition and inciting temperatures) that are unique among different types of plastics and well below the melting temperature of the silicon nitride membrane of the present invention. Silicon nitride membranes are not birefringent, thus making this novel process possible. Inexpensive optical techniques such as the thermobirefringence methods of the present invention enable low cost high volume testing for plastic microparticles in drinking water. Video Imaging of birefringence seen in plastic microparticles contained on heated microslit silicon nitride membranes or filters will allow for identification of the composition of various plastic microparticles in a given water sample. At or near their transition temperatures, different plastic microparticle types will loose their birefringence, change color, and change shape in ways that distinguish them from each other. This novel method of thermal birefringence with silicon nitride membranes is one aspect of the present invention as described and envisioned herein.

Figure 16:
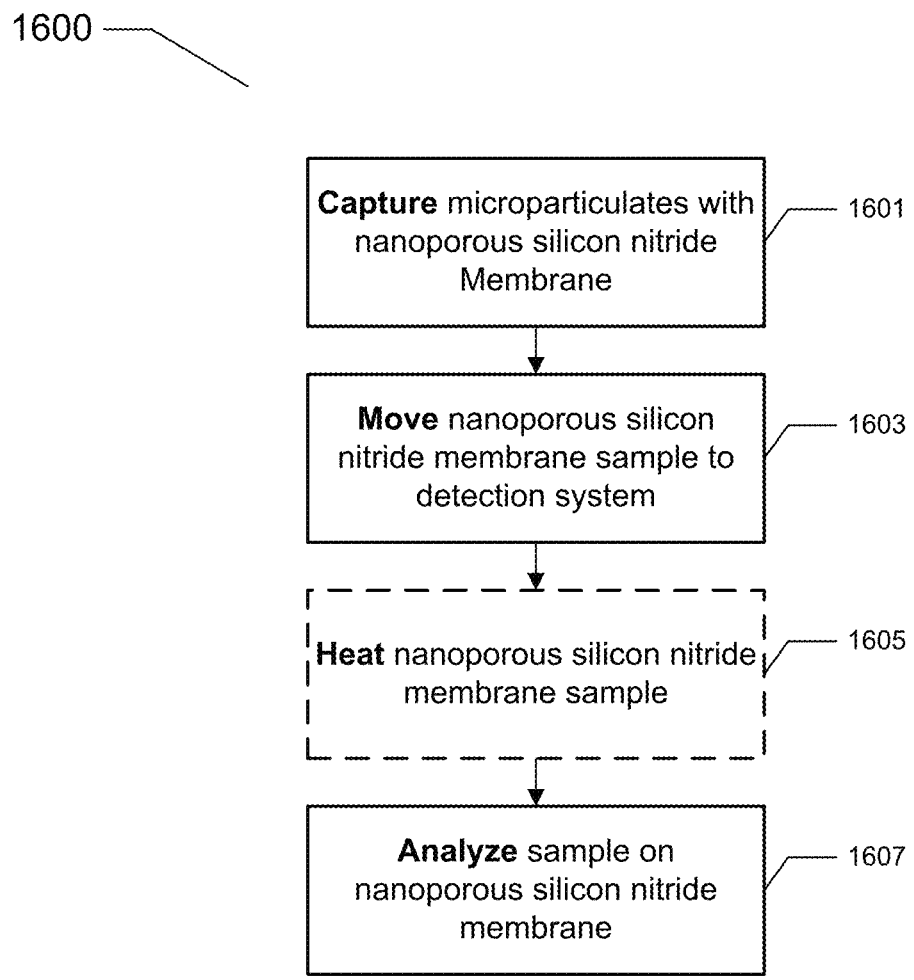
FIG. 16 is a flowchart depicting a method of the present invention.

The system for the detection and screening of plastic microparticles, as described and depicted in various embodiments herein, may be performed manually, semi-manually, semi-automated or fully automated. The method of the present invention may, in some embodiments, be implemented with software either entirely or in part, where the software is stored in a memory device or on computer readable media and is executed on a computer having a processor, memory, and access to computer readable media. The fundamental novel steps for the detection and screening of plastic microparticles, however, remain. For example, in FIG. 16 a flowchart 1600 is depicted. In step 1601 a sample such as a water sample is passed through a nanoporous silicon nitride membrane where microparticulates are captured thereupon. Once captured, the nanoporous silicon nitride membrane sample (comprising the nanoporous silicon nitride membrane and the captured particulates) is moved to a detection system in step 1603, the various detection systems being described and envisioned herein. With some detection systems, heat is applied to the nanoporous silicon nitride membrane sample in step 1605. In step 1607, the sample on the nanoporous silicon nitride membrane is analyzed using a detection system such as a detection system described and envisioned herein. The quantity and type of microparticulates is then determined from the analysis step 1607, and provides insight into contaminants contained in a water sample.

Figure 17:
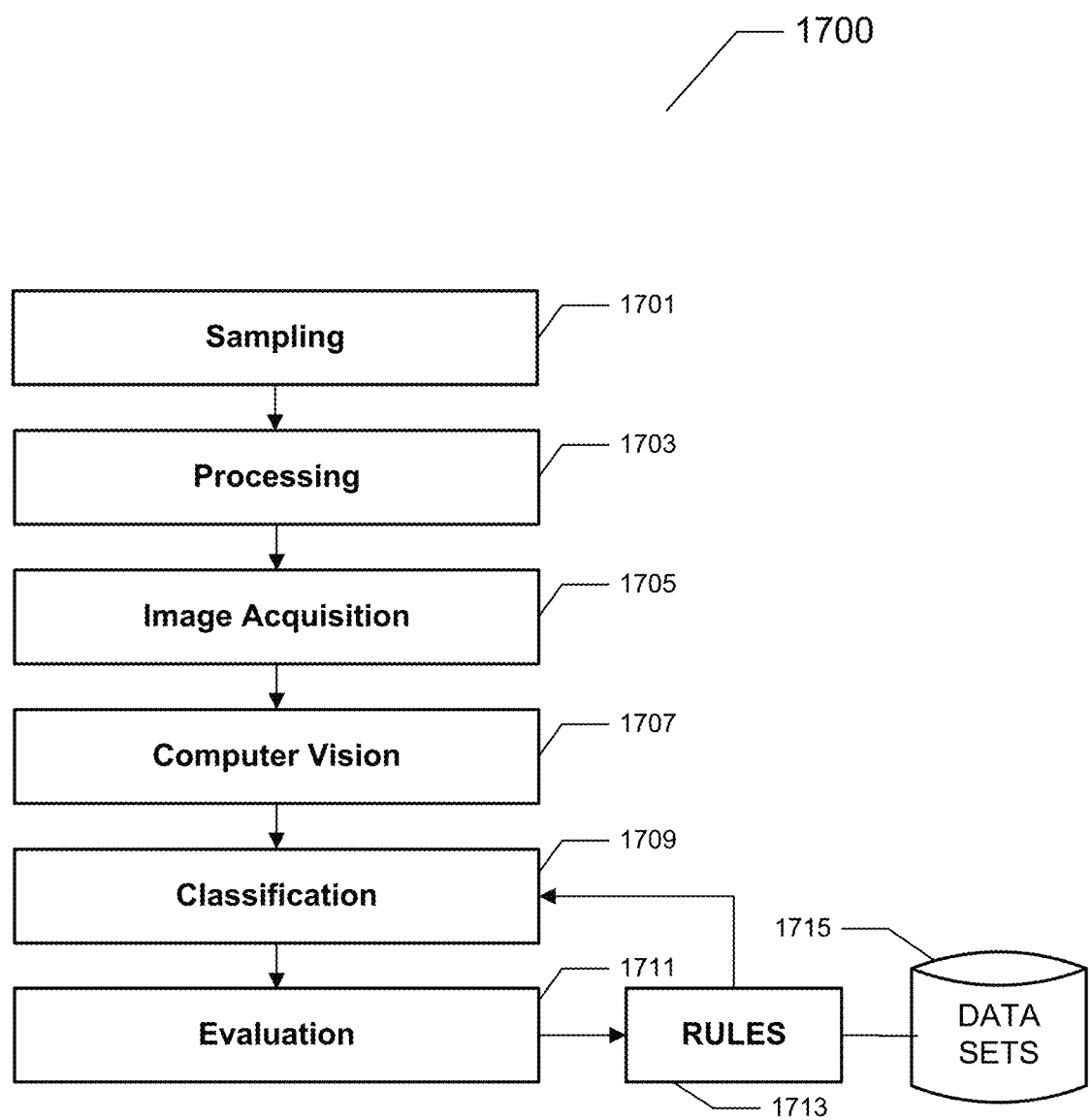
FIG. 17 is a flowchart depicting a machine learning method of the present invention.

Methods of the present invention also may include, but are not limited to, machine vision, machine learning, artificial intelligence, and the like. FIG. 17 is a flowchart 1700 depicting a machine learning method of the present invention. In step 1701, sampling of a quantity of water by passing the water through a nanoporous silicon nitride membrane occurs, with resultant entrapment of microparticulates contained in the water. In step 1703, the nanoporous silicon nitride membrane sample is processed, for example, with heat, irradiation with light, or the like. In step 1705, a machine vision or similar digital imaging system or device is used for image acquisition, with resulting computer vision processing in step 1707. From step 1707, the microparticulate images that are acquired with the machine vision system are classified in step 1709 based on their determined physical properties (such as type of material, quantity of material, average size, shape, and the like). In step 1711, the classified images are evaluated to determine further characteristics of interest. The classified and evaluated images are then used to establish rules for improved recognition of microparticulates in step 1713. These rules and related images are stored as data sets 1715 that are then used for improved recognition of microparticulates in a sample.

There are additional techniques and methods of the present invention that can also be used to facilitate identification of the types of plastic microparticles in water supplies. For example, combining the optically transparent silicon nitride membranes with a multi-modal microscope and other analytic techniques makes possible a higher level of identification for plastic microparticles.

In addition to birefringence, it is possible to obtain further information on the kinds of plastic microparticles contained in a sample by studying the fluorescence spectra of the samples. With ultraviolet excitation, some particles glow brightly, while others do not. This fluorescence mode detection may further be automated to facilitate rapid testing and throughput of testing such as, but not limited to, municipal or tap water testing. By adding a tunable optical interference filter to analyze the emission spectrum, it is possible to obtain even more information about the fluorescent energy levels in the plastic microparticles.

Figure 18:
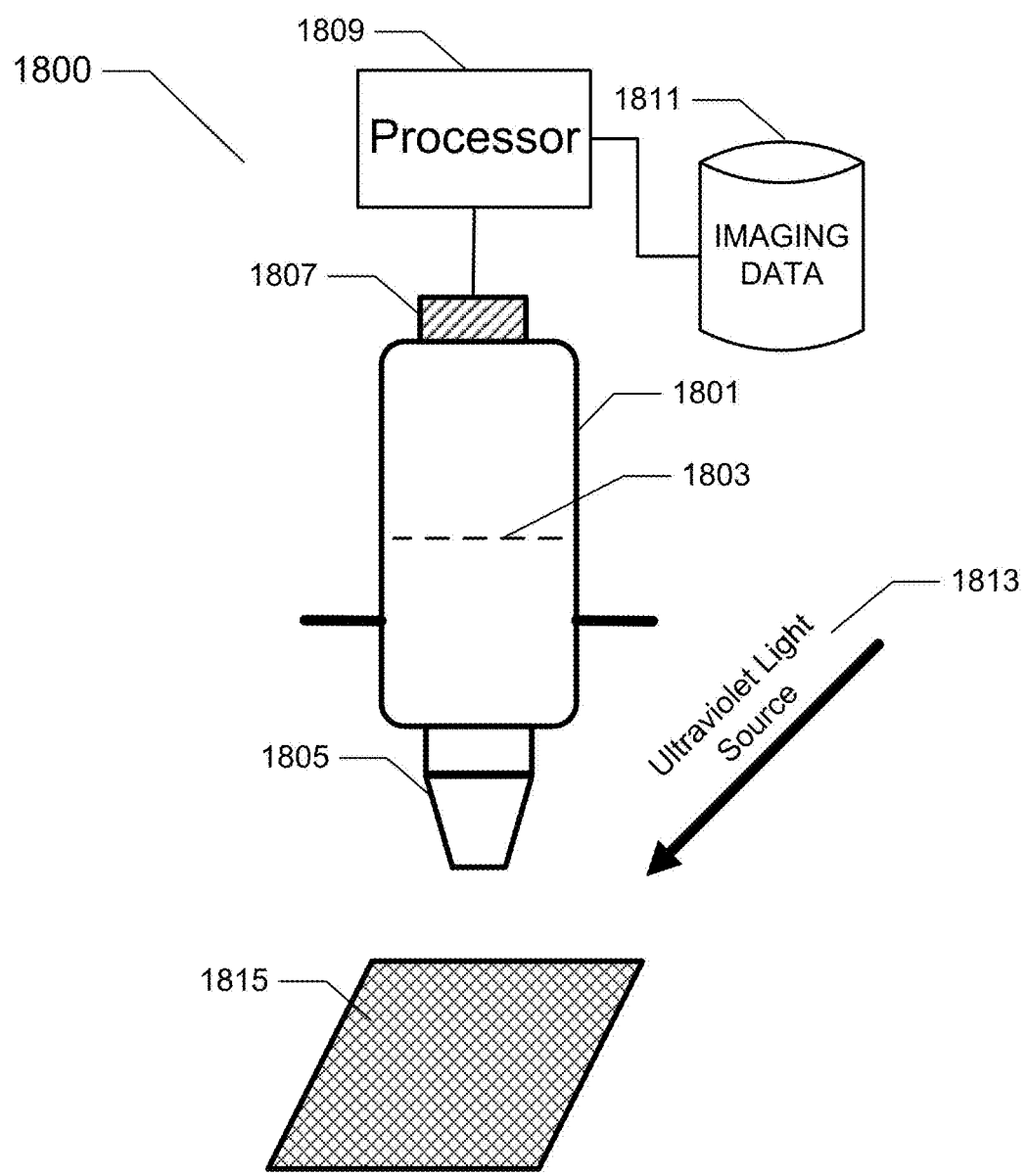
FIG. 18 is a block diagram depicting ultraviolet excitation and detection in accordance with one embodiment of the present invention.

Turning now to FIG. 18, a block diagram depicting ultraviolet excitation and detection in accordance with one embodiment of the present invention is depicted. It has been shown that various plastics fluoresce when exposed to certain wavelengths of light. In particular, using techniques of fluorescence microscopy with ultraviolet laser excitation at 266 nm., the resulting fluorescence of bulk plastic samples can be collected and used to discriminate between samples. Various types of plastics can be distinguished by measuring the spectral content of measured fluorescence signals. This technique allows for the identification of various microparticulates without the need for dye and related additional steps. It will be appreciated after further reading of this specification that in order to make rapid detection of plastic microparticles efficient, a maximum amount of spectroscopic information needs to be obtained as fast as possible. The use of wide field f-theta scanning, tunable excitation lasers, as well as various methods of fluorescence detection and thermo-modulation may also be employed with the present invention and the various embodiments described and envisioned herein.

A system for the analysis of microparticulates 1800 that uses ultraviolet excitation and detection can be seen in FIG. 18. A microscope 1801 or similar optical instrument having an objective 1805 can be seen with a CCD camera 1807 attached. Alternatively, the CCD camera 1807 may also be a spectrometer such as, but not limited to, a multichannel optical spectrometer, to detect the fluorescence spectra of the microparticulates. With such a configuration, the filter array 1803 would be a long-pass filler that blocks the ultraviolet excitation fight. The optical instrument 180 contains a filter array 1803 having one or more wavelength transmission bands. An ultraviolet light source 1813 such as, but not limited to, a 266 nm. laser, is used to irradiate a nanoporous silicon nitride sample 1815 containing entrapped microparticles. Upon irradiation with an ultraviolet light source 1813, the CCD camera 1807 collects a fluorescence image. The fluorescence image is then sent to a processor 1809 for further analysis. Imaging data 1811 related to the collected fluorescence image is then stored.

Enhanced functionality can be provided with a f-theta scanning system that can rapidly scan the entire membrane sample with a two-axis galvanometer stage, and record the detected fluorescence image with a highly sensitive detection scheme (such as a photomultiplier with an excitation chopper providing synchronous detection.) This is the most sensitive method of detection, useful for detecting intrinsic fluorescence emission from undoped commercial microplastics, however it requires spectral selection in order to distinguish between the microplastics. In some embodiments of the present invention, multiple excitation lasers are combined by one of several techniques (dichroic mirrors, diffraction grating or prisms) and applied sequentially to the excitation of the microplastics. Since various kinds of microplastics have different chemical compositions, they have different fluorescence emission properties corresponding to the available energy levels in the plastic material, and they also will have different fluorescence spectra when different excitation wavelengths are used. This technique of Fluorescence Excitation Spectroscopy can also be extended to the use of a continuously tunable UVC laser source. Further, in some embodiments multiple UV lasers (such as UVC, UVB, UVA and blue) are used for excitation of microparticles, with some embodiments using a prism or diffraction grating.

In one embodiment, UV lasers are turned on separately and a filter wheel is rotated to obtain images of the fluorescence corresponding to different emission wavelength bands. This would be done, for example, with a motorized filter wheel holding interference filters of carefully chosen transmission bands, in alignment with spectroscopic data. A synchronized two-axis galvanometer motor fitted with broadband (silver) reflecting mirrors may be used for scanning in order to focus ultraviolet light onto the required positions on the membrane. In the event that the sample is bigger than the scanning range of the galvo scanner, a synchronized x-y scanning stage can be used to increase the size of the scanned field. An additional z-axis stage can also be added to provide sample focusing.

An alternative method of parallel detection of the fluorescence spectra that is not quite as sensitive but does not require the use of interference filters to obtain spectroscopic data uses an f-theta scanning lens, galvo scanner, multiple UV excitation sources and a parallel multichannel cooled CCD-based optical spectrometer placed at element 1807.

In one method of the present invention, a rapid initial survey scan is performed, looking for the locations of fluorescence-emitting particles, then the image is magnified to study the emission spectra only in those regions, repeating at each excitation wavelength.

The excitation and emission spectra of plastics and microplastics is also temperature-dependent. Therefore, additional dimensions of information and potential discrimination can be obtained with the addition of a temperature control device, located for example between the x-y sample motion stage and the membrane sample. The rapid scanning process described herein can be repeated at a wide range of temperatures to ascertain the degree of nonradiative thermal deactivation of the fluorescence excitation spectra.

In another embodiment, a single, tunable ultraviolet laser is used instead of a discrete number of separate lasers. Depending on the cost of the individual lasers and the relative cost of the tunable UV laser, it may be beneficial to use a single tunable UV laser. Additionally, much more detailed fluorescence excitation spectra can be obtained, as a much larger number of excitation wavelengths are thereby made available for use and incorporation into the master optimization routines.

The wide operating range of silicon nitride membranes (stable up to 1000° C.) allows one to obtain further information about the melting temperatures of the various plastic microparticle components on the membranes using thermo-optical techniques. By heating the silicon nitride membranes and then watching the motion of the various particles with a video-based motion detection algorithm, it is possible to identify the melting points of the various particles. Using a similarly configured ceramic heating apparatus for the silicon nitride membrane, we can also provide additional particle analysis. For example, birefringence can be measured as a function of temperature using a ceramic heater by incorporating the heater into the birefringence microscope setup. The measurement of thermo-birefringence yields yet more information about the different plastic microparticles contained in the sample. Furthermore, applying the temperature scanning technique to the fluorescence imaging technique, it is possible to measure nonradiative activation energies in the plastic microparticles, giving further insights into the nature of the plastic microparticles.

In-situ membrane temperature monitoring may also be used to determine the make-up of the plastic microparticles captured by the silicon nitride membrane filter during a test. Using optical techniques, it is possible to simultaneously make accurate measurements of the temperature of the silicon nitride membrane by measuring the transmission spectrum of the surrounding silicon wafer that supports the silicon nitride membrane filter. The absorption spectrum of silicon and its temperature dependence are well-known and can be used to calibrate the temperature of the membrane.

It is, therefore, apparent that there has been provided, in accordance with the various objects of the present invention, a device, system and method for the detection and screening of plastic microparticles in a sample.

While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims and drawings appended herein.

What is claimed is:

1. A method for the detection and screening of plastic microparticles, the method comprising the steps of:
    delivering a sample through a nanoporous silicon nitride membrane;
    entrapping on the nanoporous silicon nitride membrane microparticles contained in the sample;
    providing an increasing temperature profile to the silicon nitride membrane;
    observing a phase change of the entrapped microparticles; and
    recording the temperature at which the entrapped microparticles change phase.

2. The method of claim 1, wherein the observing is performed by a machine learning tool.

3. The method of claim 1, wherein the recording is performed with a computer.

4. The method of claim 1, further comprising the step of determining the type of entrapped plastic microparticle based on the temperature at which the entrapped plastic microparticle changes phase.

* * * * *